(12) United States Patent
Ryan

(10) Patent No.: US 6,576,331 B1
(45) Date of Patent: Jun. 10, 2003

(54) LOAD-CARRYING STRUCTURES COMPRISING BAMBOO FIBERS AND POLYMERS

(76) Inventor: Dale Bradley Ryan, 1001 Chalkstone Dr., Mitchell, SD (US) 57301

( * ) Notice: Subject to any disclaimer, the term of this patent is extended or adjusted under 35 U.S.C. 154(b) by 0 days.

(21) Appl. No.: 09/260,904

(22) Filed: Mar. 2, 1999

Related U.S. Application Data

(63) Continuation-in-part of application No. 08/908,589, filed on Aug. 8, 1997, now Pat. No. 5,876,649, which is a continuation-in-part of application No. 08/696,484, filed on Aug. 14, 1996, now abandoned.

(51) Int. Cl.⁷ .......................... B32B 27/04; B32B 27/12; B32B 5/00; C08K 11/00
(52) U.S. Cl. ................. 428/297.4; 264/241; 428/300.1; 524/9
(58) Field of Search .............................. 524/9; 264/241, 264/271.1; 428/297.4, 300.1

(56) References Cited

U.S. PATENT DOCUMENTS

| | | | |
|---|---|---|---|
| 3,544,669 A | | 12/1970 | Schock |
| 4,365,710 A | * | 12/1982 | Swanson .................... 206/386 |
| 4,631,308 A | * | 12/1986 | Graham et al. ............. 524/272 |
| 4,774,121 A | | 9/1988 | Vollenweider, II |
| 5,164,432 A | * | 11/1992 | Dehennau et al. ............. 524/13 |
| 5,432,007 A | * | 7/1995 | Naito .......................... 428/447 |
| 5,636,577 A | * | 6/1997 | Gow .......................... 108/51.1 |
| 5,773,138 A | * | 6/1998 | Seethamraju et al. ........ 428/326 |
| 5,776,281 A | * | 7/1998 | Evans .................... 156/244.17 |
| 5,786,063 A | | 7/1998 | Shibusawa et al. |
| 5,834,105 A | | 11/1998 | White et al. |

FOREIGN PATENT DOCUMENTS

| | | |
|---|---|---|
| DE | 2126319 | 12/1971 |
| JP | 53-55372 | 5/1978 |
| JP | 05031705 | 2/1992 |
| JP | 07216191 | 8/1995 |

OTHER PUBLICATIONS

Chemical Abstracts 107:135345q, 1987.
Chemical Abstracts 116:199922u, 1992.
Chemical Abstacts 117: 173557Z, 1992;.
Chemical Abstracts 118: 148517Z, 1993;.
Xian—Chem. Abstr. 122:107321v, 1995.*
Jain—Chem. Abst. 122:241192g, 1995.*

* cited by examiner

Primary Examiner—Cheryl A. Juska
Assistant Examiner—Christopher C. Pratt

(57) ABSTRACT

Shaped load-carrying structures are fabricated using bamboo linear fibers with a compatible bonding material and synthetic polymers such as polyesters, epoxies, and polyolefins. The structures are manufactured by coating at least one of bamboo culms, split bamboo culms, bamboo fiber tape, or prepared bamboo fibers with a bonding material to produce a core. The core is then combined with a polymer matrix and extruded or molded to form a structure having the desired shape. The structures compare favorably with wood, steel, and concrete regarding strength, longevity, price and ability to withstand earthquakes. The structures may be used as beams, columns, telephone poles, marine piles and pallets.

10 Claims, 4 Drawing Sheets

LOAD-CARRYING STRUCTURES COMPRISING BAMBOO FIBERS AND POLYMERS

CROSS-REFERENCE TO RELATED APPLICATIONS

This is a continuation-in-part of application Ser. No. 08/908,589 filed Aug. 8, 1997 now U.S. Pat. No. 5,876,649 dated Mar. 2, 1999 which is a-continuation-in-part of application Ser. No. 08/696,484 filed Aug. 14, 1996, now abandoned.

BACKGROUND OF THE INVENTION

1. Field of the Invention

This invention relates to poles, pilings, railroad cross-ties, and load-carrying structures, such as beams, columns and pallets made up of linear bamboo fibers bonded to, and surrounded by, synthetic polymers and to processes of preparing these structures.

2. Description of the Related Art

Presently, wood timber beams, columns and lumber depend on specie and dimensional size as the only engineering variables. Paint and other chemical treatments are used to lengthen the life of wood products that are exposed to the elements. However, there has been a growing concern over these toxic chemical treatments. Creosote, which has been used for years, is now considered to be a carcinogen, and has been banned from marine timber applications where immersion allows seepage into surrounding waters. Railroads are similarly concerned about creosote treated cross-ties. Utility companies are aware of the danger these preservatives present to their linemen and material handling people. Managed forests are producing faster growth but lower grade timber than was available a few years ago. This new timber sometimes does not pass the ANSI standards for timber pole structures.

Concrete with reinforcing steel has a greater ability to be custom engineered for various specific applications. However, the resulting products are extremely heavy, and in the case of load-carrying structures, such as bridges, the greatest portion of the structure is involved in holding itself up. This extreme weight forces many concrete structures to be fabricated on-site as opposed to being built in the factory. This adds greatly to the cost of these products. Also, concrete is very sensitive to motion, such as caused by earthquakes. Thermal expansion and freeze-thaw cycles wreak havoc on concrete components. A lightweight load-carrying beam, column or cross-tie that would not be sensitive to seismic or temperature changes would be a very desirable replacement for concrete.

Structural steel is extensively used for beam and column applications due to its strength, workability, and other factors. Steel has an on-going maintenance problem due to rust and corrosion that shortens its life span. Also, energy costs to produce steel and to fabricate and maintain steel components are quite expensive, keeping the price of the raw materials and finished products high.

Fiberglass is being researched and new products are being developed regularly, but the high cost of glass fibers and the resin matrices has proven to be a formidable barrier to overcome.

One particular application that has been traditionally filled by wood products is the construction of pallets. A typical wood pallet is approximately 40 inches by 48 inches by 5 inches and comprises a plurality of top slats and bottom slats supported on edge oriented 2×4" timbers. The market for such pallets is several million each year. While this market is a substantial drain on the timber industry, such wood pallets are not a preferred pallet for the food industry. In the food industry, contamination is a problem and efforts have been made to create a sanitizable pallet for re-use. Various efforts have been made to create a plastic pallet but such efforts have been largely unsuccessful for at least two reasons. A first reason is that plastic, as its name implies, will deform in response to load and therefore creates a failure condition when loaded pallets are mounted on edge racks in warehouse storage. A second problem is that plastic is substantially more expensive than wood raising pallet costs by several multiples. Accordingly, it would be advantageous to provide a structural substitute for wood and plastic in the pallet industry.

Bamboo has been considered for use in weight-bearing structures. Thus, Chemical Abstracts 107:135345q (1987) discloses composite materials containing 0.3–1 mm long bamboo strips, powdered bamboo, powdered wood, and resin in a molded piece. Chemical Abstracts 122:107321v (1995) discloses bamboo fibers as a reinforcing material for resinous composite structural panels. Chemical Abstracts 122:241192g (1995) discloses bamboo fibers and strips as reinforcing materials for thermosetting resin structural materials. Chemical Abstracts 118:148517z(1993) discloses strands of bamboo fibers as reinforcing materials for resinous laminates. Chemical Abstracts 117:173557z (1992) discloses bamboo fiber reinforced plastic structural materials. This reference also teaches a perfect bonding between the bamboo and the resin. Chemical Abstracts 116:199922u (1992) discloses bamboo fibers treated with a binding agent used in concrete structural materials. U.S. Pat. No. 4,774,121 to Vollenweider, II discloses blocks comprising stalks of bamboo surrounded by plastic foam cut into thin sections and coated with fiber reinforced plastic to be used in boat construction. The inventor has found that, contrary to the teachings of Chemical Abstracts 117:173557z, the use of untreated bamboo fibers as reinforcing agents for resinous structural materials results in slippage between the bamboo fibers and the resin matrix.

The present invention seeks to eliminate the above-noted disadvantages by providing a low-cost, high-strength composite formed from linear bamboo fibers bonded to synthetic polymers with binding agents which have been found to provide exceptional binding between the bamboo fibers and the polymer matrix. These composites can replace wood, concrete, steel, or fiberglass reinforced polymers in poles, pilings, and load-carrying structural applications such as pallets.

SUMMARY OF THE INVENTION

This invention seeks to provide an improved composite that has the ability to overcome the disadvantages of the presently available structural materials. In accordance with this invention, a composite structural piece is provided which comprises linear bamboo fibers bonded to and surrounded by synthetic polymers such as thermoplastic and thermosetting resins. In one form, the fibers are formed in elongated strips with an outer polymer coating and compression cut into short stubs which can be used in place of conventional plastic nodules in an injection molding machine. Products formed by injection molding using this form are lighter in weight and stronger than items molded of plastic alone.

In preparing the products of this invention, bamboo fibers of dimensionally equal sizes are treated or primed with a bonding material to be described below so as to accept a synthetic polymer. The fibers may take the form of split culms or tape. The products may be prepared by extruding a mixture of primed linear bamboo fibers and synthetic polymers or the product may be prepared by molding the mixture. The products may desirably take the form of beams, columns, poles, dimensional lumber or other structural products.

BRIEF DESCRIPTION OF THE DRAWINGS

For a better understanding of the present invention, reference may be had to the following detailed description taken in conjunction with the accompanying drawings in which:

FIG. 6b is an elevational view of a rectangular die used according to this invention as a replacement for the circular die in the extrusion machine of FIG. 6a;

DESCRIPTION OF THE PREFERRED EMBODIMENTS

Figure 1:
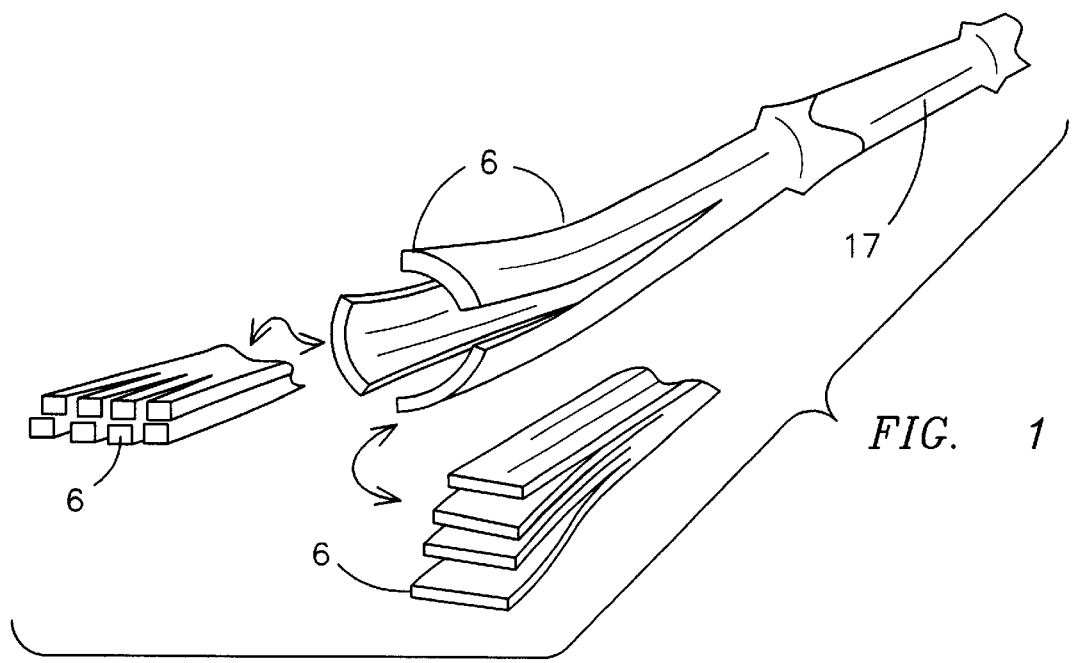
FIG. 1 is an elevational view of a split bamboo culm and gives a pictorial explanation of the making of bamboo fibers and tapes useful in this invention.
Figure 2:
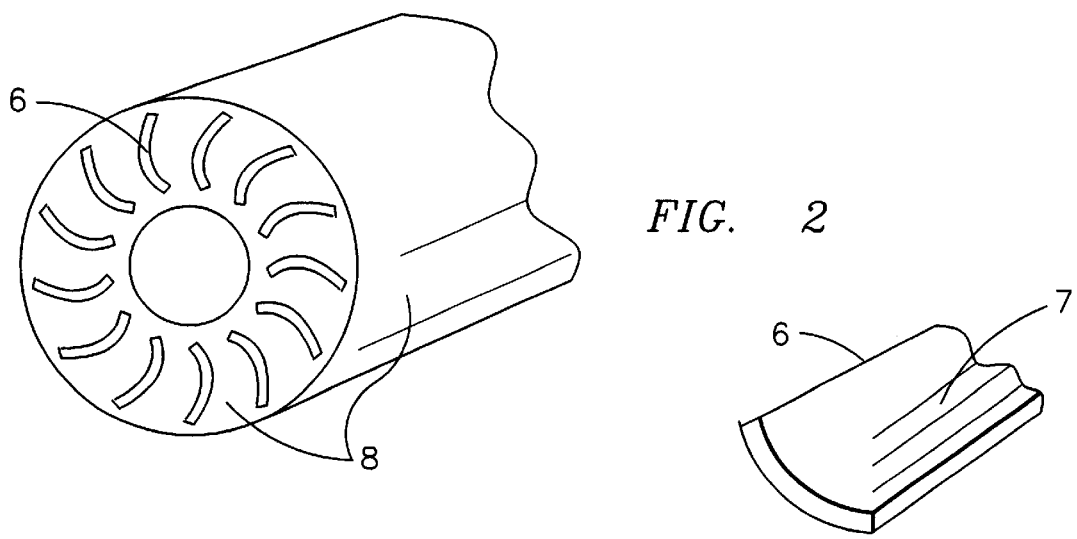
FIG. 2 is an elevational view showing a utility pole prepared according the extruding method of this invention.
Figure 3:
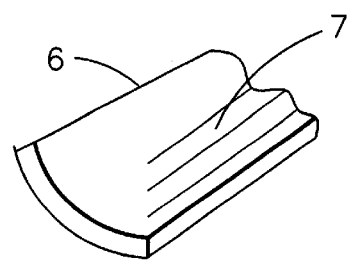
FIG. 3 is an elevational view of a primed split bamboo culm.

The invention will now be described with reference to the above drawing. In all Figures, like numerals represent like features. In accordance with this invention, a load-carrying structure 1 is provided which comprises linear bamboo fibers 6 bonded to, and surrounded by, synthetic polymers 8. The bamboo fibers 6 may be in the form of split culms 17 or tapes. The structures 1 are made from bamboo culms 17 which are split into dimensionally equal sizes and treated with a bonding material 7.

It has been found that the following binding agents give surprisingly good bonding between the bamboo and the polymer matrix: maleated polypropylene, maleated polyethylene, maleic anhydride, hydroxyl methacrylate, silane compounds, N-vinyl pyridine, N-vinyl caprolactam, N-vinyl carbazole, methacrylic acid, ethyl methacrylate, isobutyl methacrylate, sodium styrene sulfonate, bis-vinyl phosphate, divinyl ether-ethylene glycol, vinyl acetate, vinyl toluene, vinylidene chloride, chloroprene, isoprene, dimethylaminoethyl methacrylate, isocetylvinyl ether, acrylonitrile, glycidyl methacrylate, N-vinyl pyrrolidone, acrylic acid, ethyl acrylate, itaconic acid, methyl acrylate, sodium vinyl sulfonate, cetyl vinyl ether, divinyl ether-butanediol, and octadecyl vinyl acetate.

According to one aspect of this invention, a plastics extruding machine 10 (FIG. 6a) is connected to a die 9 that allows the bamboo fibers 6 (FIG. 1) primed with at least one of the above binders to fill the outside circumference of a die 9. The primed bamboo fibers 6 enter the die 9 as heated plastic 8 is injected under high pressure and caused to flow through the interior of the die 9. The mixture of primed bamboo fibers 6 and plastic 8 is extruded as a column and enters powered pullers 12 that are capable of extracting the column to form any practical length. A power saw 13 travels beside the extruded piece, sawing it to a desired length without slowing the extruding process. The traveling saw 13 returns to its starting point to select the next length. The thus-prepared composite structure 1 is transferred to a water-cooled bath 14 where it is cooled to ambient temperatures and the sawed ends are capped.

In an alternate method of preparing bamboo fiber 6/plastic 8 composite structures 1 according to this invention, the bamboo fibers 6 are primed by coating at least one of the above binders by immersing the bamboo fiber in a bath of the primer, spraying the binder onto the bamboo fiber, or brushing the primer onto the bamboo fiber. The primed bamboo fiber is secured to a carrying core 2 of wood or metal to form a core assembly and this core assembly is inserted into a mold 18 and positioned so as to allow clearance for the plastic 8 matrix to flow around all exposed surfaces in desired thicknesses. The mold 18 is heated and connected to an extruder 10 or large injection molding machine. Some molds may require a vacuum to be pulled by a vacuum system 19 on the interior of the mold 18 prior to injection. The synthetic polymer 8 is then injected, the mold 18 is chilled, and the resulting composite structure 1 is removed from the mold 18.

Some plastics have an almost unlimited life span when exposed to the elements. This explains the ability of fiberglass to dominate the marine market where wood and steel require too much maintenance. However, plastics by themselves lack sufficient tension and compression strength to stand alone as load-carrying structures. The marine industry solved this problem with the addition of glass fibers to the plastic matrix resulting in fiberglass. This engineered composite has three times the load-carrying capability of steel of an equal weight. The cost of glass fiber reinforced plastics has limited this material to special products and niche markets. Asian and some South American bamboo species such as Gradua and Tonkin cane have tension strength close to steel and compressional strength exceeding concrete. At 1/100 the cost of glass fiber, linear bamboo fiber can be more competitive with traditional materials. By utilizing fiber in a plastic matrix, the resulting composite is very strong and has the nearly unlimited life span of the plastic exterior.

In order to produce load carrying structures from the composite of this invention, the bamboo linear fiber 6 must bond to the plastic matrix 8. The elongation of the plastic glue allows the load to be evenly distributed along all of the unidirectional bamboo fibers 6. This is the key to the exceptional strength of the composite structures 1 of this invention. A bonding material 7 of at least one of the materials named above is used, allowing difficult matrices, such as polyethylene, to bond to the bamboo fibers 6.

In making the structures 1 of this invention, a bamboo culm 17 is split to its desired size. The fibers 6 may take the form of a full width split bamboo culm, smaller slices, or a tape. In all figures of this description, linear bamboo fiber refers to all three of these possibilities.

The linear bamboo fiber 6 is treated with at least one bonding agent 7 as described above, most preferably acrylic acid or maleic anhydride or salt or ester derivatives thereof, to promote the adhesion of the fibers 6 to the synthetic polymer matrix 8. The synthetic polymer 8 may be a thermosetting resin or a thermoplastic resin.

Figure 6B:
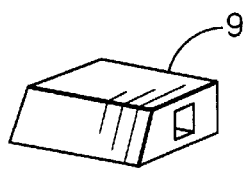
Figure 6A:
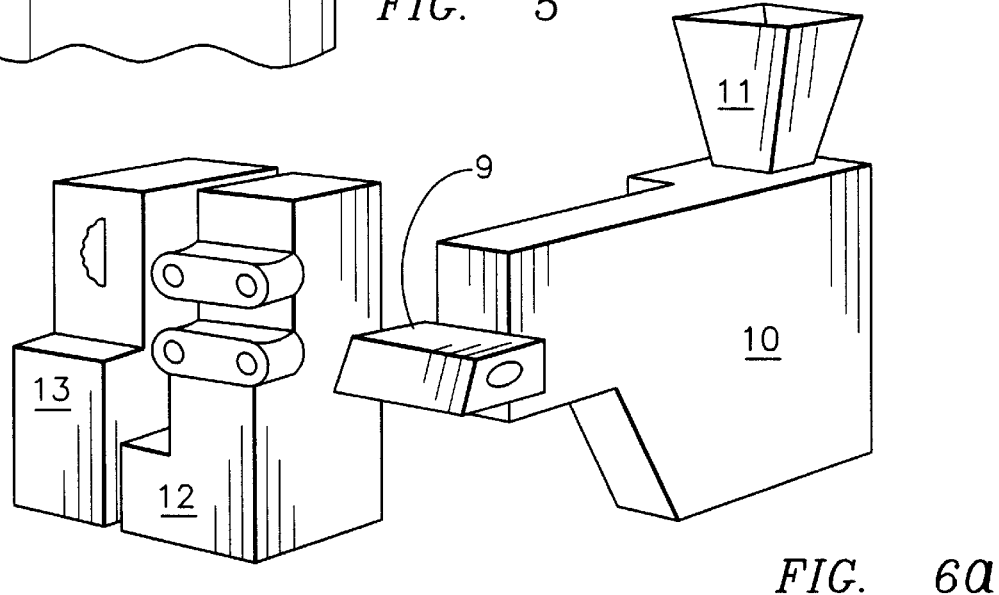
FIG. 6a is a graphical representation of the extrusion machine having a circular die used according to this invention.
Figure 7:
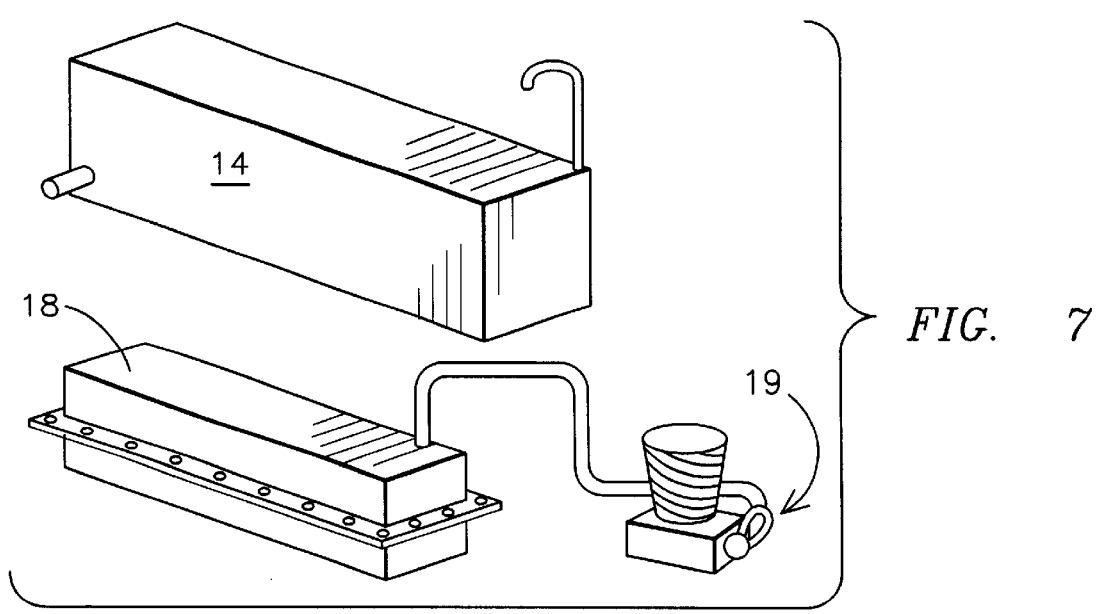
FIG. 7 is a graphical representation of a cooling bath and a molding apparatus used according to this invention.
Figure 8:
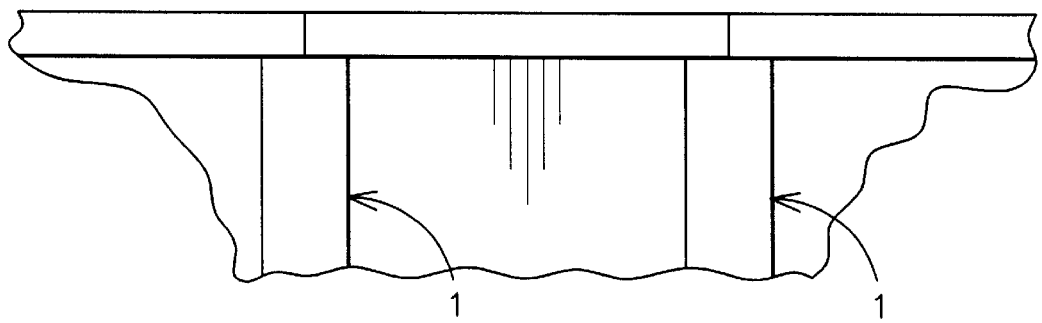
FIG. 8 is a side elevational view of a bridge made using supporting columns prepared according to this invention.

With reference to FIG. 6a, in preparing poles or pilings, dried and split bamboo culms 17 of a length equal to the pole or piling being produced are treated with a bonding material 7 as described above and inserted into the die 9 and a synthetic polymer 8 such as recycled polyethylene pellets is loaded into the hopper 11 of the extruder 10. The extruder 10 is heated to melt the polymer 8. The extruder 10 is turned on and the pushers or pullers 12 start to insert the bamboo fiber 6 reinforcement into the proximal end of the heated die 9 while the extruder 10 begins to inject molten plastic 8 into the die 9. The molten plastic 8 completely envelops the bamboo fiber 6 and the mixture of bamboo fiber 6 and synthetic polymer 8 starts to emerge from the distal end of the heated die 9. At a proper time, the puller 12 engages the cooled composite extrudate as it emerges from the die 9. This process continues until the desired length of extrudate is obtained. The traveling saw 13 starts sawing off the desired length of extrudate and automatically returns to the starting position to begin sawing the next section. The newly extruded pole or piling is chilled in a circulating water bath 14 ad when sufficiently cooled is placed into storage.

Because utility companies presently prefer tapered poles, it is anticipated that utility poles may be produced as a thick-walled pipe in a molding process. For example, a thin wall tube is first extruded from pelletized material such as the below described bamboo pellets. The tube is then wrapped with bamboo fibers using the tape form building up different thicknesses to create a desired taper. The wrapped pole is placed in a mold and the plastic polymer injected to coat the pole. Alternately, the inner tube could be molded with a tapered shape and then uniformly wrapped with bamboo tape to create a tapered product which is again placed in the final tapered mold and injection coated with polymer.

Figure 4:
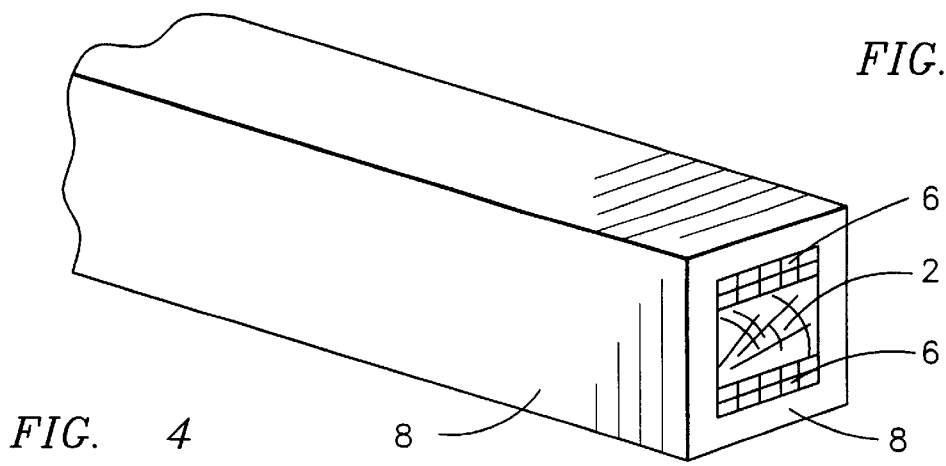
FIG. 4 is an elevational view of a beam containing a synthetic polymer circumference and an interior comprising bamboo fiber and wood prepared according to the molding method of this invention.

A cross-arm for a utility pole may be similarly constructed. Bamboo linear fiber 6 in the form of a tape is treated with at least one bonding material 7 as described above and is bonded to a central carrier core 2. This assembly is forced through a die 9 to produce a rectangular beam cross-section, as shown in FIG. 4. The die 9 operation, the extracting, and cooling are identical to the operation described for producing poles or pilings.

Figure 5:
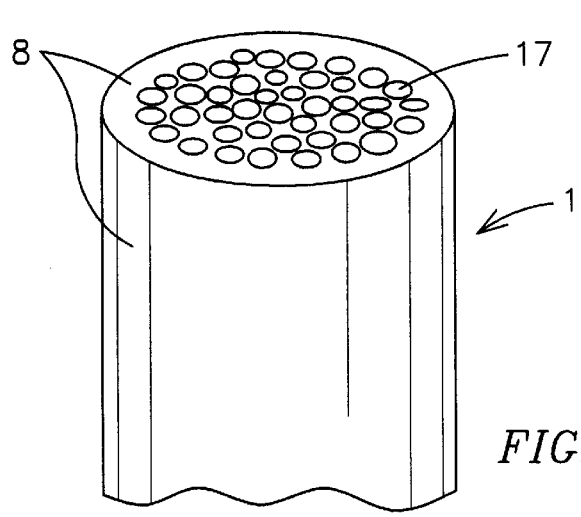
FIG. 5 is an elevational view of a supporting column made according to this invention.

Other structures incorporating bamboo as a filler can also be injection molded by preparing bamboo in small, plastic encapsulated beads or pellets that can be fed into the machine 10 through hopper 11 in the same manner as conventional plastic beads. In one form, the bamboo beads can be made by extrusion molding a continuous strip as described above for a bamboo fiber 6/plastic 8 composite structure such as is shown in FIG. 5. However, the cross-sectional dimension is substantially reduced to about 0.25 inches. The elongated strip is then cut into about 0.25 inch lengths. Preferably the cutting process is implemented by a chopping type cutter having opposing cutting blades that are somewhat dull so as to effectively compress the outer plastic layer over the ends of the bamboo fibers during the cutting process so that all surfaces of the fiber are generally encompassed within the plastic. The resulting product is a pellet that may be generally oval shaped by the cutting process and includes a bamboo fiber core within an outer plastic layer. When the pellets are fed through hopper 11 into extruder 10, various shaped objects, depending upon the form of the mold coupled to the extruder, may be made from this lightweight, filled bamboo plastic composite. The bamboo provides structural support to enable formation of objects having thickened supports or walls. While the 0.25 inch dimension is believed to be a best mode, it will be recognized that other dimensions may be more appropriate for some applications.

For making columns having maximum compressional load-carrying capacity, the bamboo culms 17 are treated with at least one of the bonding materials 7 named above and are inserted into a mold 18. The synthetic polymer is then introduced into the mold 18 to bond to, and surround, the bamboo culms 17. In this way, support columns of exceptional load-carrying ability and the ability to withstand seismic events and other horizontal pressures are produced.

While various structural devices can be made using the inventive bamboo/plastic composite of the present invention, one application that is adaptable to such composite is the structural pallet. As previously mentioned, pallets are used worldwide for supporting various products for shipment or storage. The use of pallets is so pervasive that standards have been established to define sizes of pallets. In the United States, one standard is the Grocery Manufacturers Association or GMA standard defining a pallet of 40 inches by 48 inches with a bottom structure having a cross-shaped form, i.e., having 4 large openings and a perimeter base. Europe has a different standard in which the bottom structure for the Euro-pallet uses three lengthwise extending boards or braces and the overall dimension is 1000×1200 cm. In general, the standards require that the pallet be able of edge mounting in warehouse racks with a 2000 lb. load and exhibit less than one inch deflection. These standards have created a problem for plastic pallets since plastic flows under load, is substantially weaker than an equivalent volume of wood and costs about 3 times the price of wood. However, plastic does have the advantage of being cleanable or sterizable.

Figure 9:
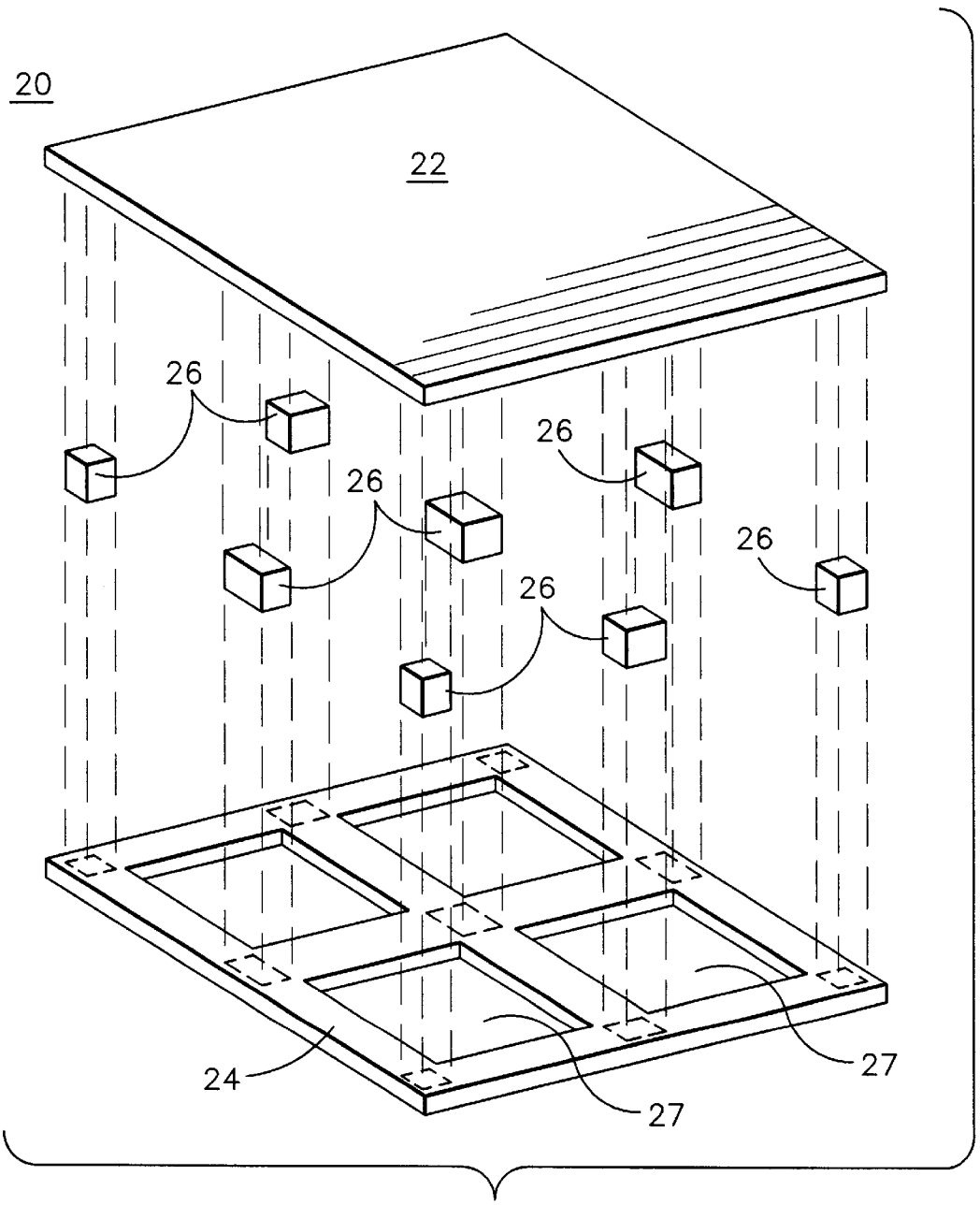
FIG. 9 is an exploded view of one form of structural pallet using at least some of the teachings of the present invention.

Referring now to FIG. 9, there is shown an exploded view of a pallet 20 having a solid top panel 22, a bottom panel 24 conforming to GMA standards and a plurality of support blocks or spacers 26 which support and position top panel 22 with respect to bottom panel 24. The top panel 22 is formed of a plurality of bamboo strips of the type described above which may be laid in layers with each layer being oriented at 90 degrees to adjacent layers or, in a preferred form, with the strips woven into mats that can be laid atop one another to a desired number of layers. For weight reduction, the top panel 22 may be cored somewhat like bottom panel 24. The spacers 26 may be injection molded blocks using the aforementioned bamboo/plastic pellets or may be sections of an extruded elongate composite such as shown in FIG. 5. Bottom panel 24 is formed by multiple overlapping layers of bamboo fibers bonded using the above described methods. All the exposed surfaces of the top and bottom panels and spacers are protected and covered by an outer plastic shell.

Figure 10:
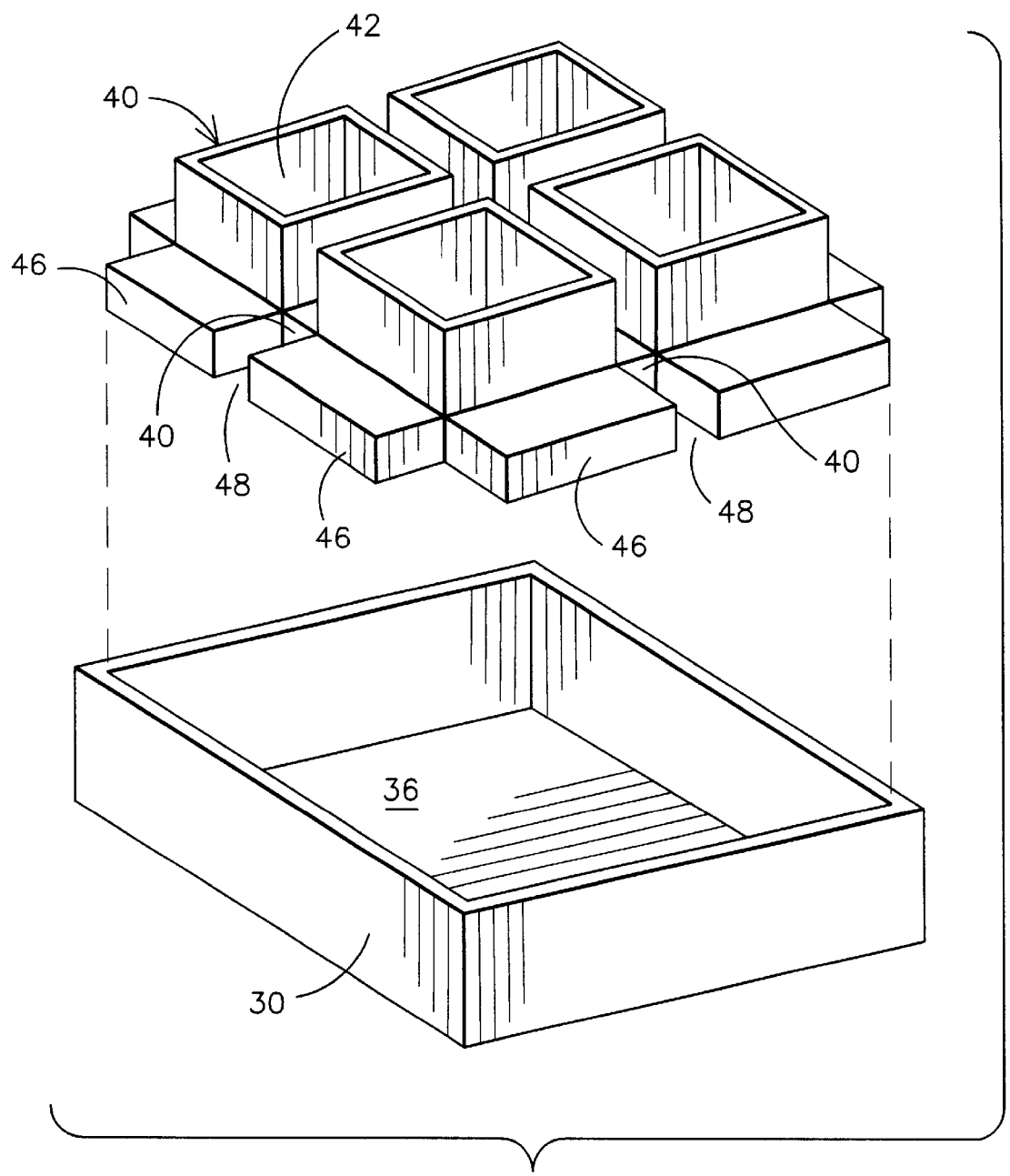
FIG. 10 illustrates a mold for producing the pallet of FIG. 9.

FIG. 10 illustrates a simplified form or mold 28 for producing the GMA pallet 20 of FIG. 9. The mold 28 includes a base 30 having a bottom member 32 to which are attached outer periphery defining side members 34. The pallet 20 is actually formed in an inverted orientation and the inner surface 36 of member 32 may desirably be embossed with selected patterns so as to form mating patterns on an upper surface of the pallet to minimize sliding of a load on the pallet's plastic surface. The embossing on the surface 36 is preferably formed as continuous connected grooves such as in a spider web configuration (radial lines intersecting concentric circles) so as to create flow paths for injection of plastic into the mold for covering the bamboo mats. In the use of the illustrated mold, the bamboo fibers, preferably in the form of woven mats, are laid into the mold base 30. It may be desirable to create a pre-form of bamboo fibers, either woven or transversely overlaid, that are glued together similar to the process described above for producing columns or timbers, so that the pre-formed base of bamboo can be easily positioned in mold base 30. As will be apparent, plastic molding generally requires that the mold be pre-heated and, while heating apparatus is not shown, those skilled in the molding art will understand various methods and apparatus for pre-heating the mold components to temperatures suitable for molding, e.g., about 400° F.

After the pre-form of fiber mats are laid in the mold base 30, a male insert section 40, also pre-heated, is positioned in base 30 overlaying the fiber mats. The section 40 includes four open-top box members 42 coupled together by intermediate closed connectors 44. The members 42 are shell structures in order to reduce weight and to enable placement of hydraulic/pneumatic actuators (not shown) in the members 42. The actuators are attached to extendible blocks 46 protruding outward from the members 42. The illustrated mold 30 is designed to produce the GMA pallet of FIG. 9 in the inverted position and the members 42 define the four openings 27 in the bottom panel 24. The extendible blocks 46 establish the position of the spacers 26. The blocks 46 are preferably extendible from members 42 and can be retracted to facilitate removal of the section 40 from the base 30 and molded pallet. However, it will be recognized that retracting all the blocks 46 into members 42 will create an interference problem. Mold designers will understand that one process to resolve interference is to associate some of the blocks with the base mold 30 rather than with the removable section 40.

With the section 40 positioned in base 30 over the bamboo mats, the openings 48 between blocks 46 define positions for spacers 26 and such spacers are inserted into the mold. Bamboo fiber reinforced tape or fiber reinforced extruded bamboo/plastic composite strips are next laid over the blocks 46 and spacers 26 forming the bottom panel or skid 24 of the pallet. A die (not shown) having the same configuration and size as the panel 24 is then brought into position and compresses the mold assembly to about 75% of maximum pressure. Plastic is then injected into the mold at relatively low pressure so as not to disturb the bamboo fiber mats. Once the mold cavities have been filled with the molten plastic, plastic injection is shut-off and the die is closed to 100% volume to consolidate the pallet. During the consolidation stage, the spacers 26 bond to the upper and lower panels through the plastic matrix. Mold temperature can be reduced at this stage to cool the plastic sufficiently to allow the completed pallet to be removed from the mold. During this process, the die is retracted and the section 40 lifted from the base 30, carrying the finished pallet supported on at least some of the extended blocks 46. The pallet is removed from section 40 by retracting blocks 46 into members 42. The mold is then ready to be used for another pallet manufacture.

The mold assembly of FIG. 10 is provided only by way of example of a method for manufacturing a bamboo/plastic composite pallet. For production of large volumes of pallets, it is anticipated that the mold assembly will be substantially modified and will have other moving elements to speed-up and simplify the molding process. Accordingly, it is not intended that the invention be limited by the illustrated mold assembly or process. For example, it may be desirable to form the pallet in multiple steps such as by molding top panel 22 in one operation, molding bottom panel 24 in another operation and then attaching the top and bottom panels together by adhesively bonding spacers 26 to facing surfaces using a plastic solvent type adhesive or heat to raise the plastic temperature to a bonding state.

While the invention is primarily directed to and has been tested using bamboo, it is possible that other fibrous plant material may be found suitable as a replacement for bamboo. For example, Indian hemp, agave sisalana, rattan palm and papyrus palm also produce fibrous material that is often used in manufacture of cord and rope for handling tensile loads.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A shaped load-carrying structure comprising a plurality of linear bamboo tape pieces coated with at least one binder and surrounded by a synthetic plastic material, wherein the binder is at least one member selected from the group consisting of maleated polypropylene, maleated polyethylene, maleic anyhdride, hydroxyl methacrylate, N-vinyl pyridine, N-vinyl caprolactam, N-vinyl carbaxole, methacrylic acid, ethyl methacrylate, isobutyl methacrylate, sodium styrene sulfonate, bis-vinyl phosphate, divinyl ether-ethylene glycol, vinyl acetate, vinyl toluene, vinylidene chloride, chloroprene, isoprene, dimethylaminoethyl methacrylate, isocetylvinyl ether, acrylonitrile, glycidyl methoacrylate, N-vinyl pyrrolidone, acrylic acid, ethyl acrylate, itaconic acid, methyl acrylate, sodium vinyl sulfonate, cetyl vinyl ether, divinyl ether-butanediol, and octadecyl vinyl acetate, the plurality of linear bamboo tape pieces being unidirectional and surrounded by the synthetic plastic material.

2. A shaped load-carrying structure comprising a plurality of bamboo fibers coated with a binder and surrounded by a synthetic plastic material wherein the structure is formed in the shape of one of the group consisting of beams, columns, poles and dimensional lumber, and the bamboo fibers consist of one of the group of bamboo split culms or pieces of bamboo tape.

3. The structure of claim 2 wherein the bamboo fibers are of substantially dimensionally equal sizes.

4. A shaped load-carrying structure comprising a plurality of split linear bamboo culms covered with at least one binder and surrounded by a synthetic plastic material wherein the structure comprises a pallet, wherein the pallet comprises a top panel, a bottom panel and a plurality of spacers connecting the top panel to the bottom panel and defining an opening therebetween for receiving forks of a transport apparatus, wherein the top panel comprises a plurality of stacked woven mats of bamboo fiber adhesively bonded together and encased in a polymeric plastic coating.

5. A shaped load-carrying product comprising a plurality of bamboo tape elements coated with a binder and bonded to and surrounded by a molded plastic material.

6. The product of claim 5 wherein the bamboo tape elements are of substantially dimensionally equal sizes.

7. The product of claim 5 wherein the plurality of bamboo tape elements are further bonded to a central core that together with the bamboo tape elements forms an interior element surrounded by the molded plastic material.

8. The product of claim 5 wherein the molded plastic material is formed in the shape of one of the group consisting of beams, columns, poles and dimensional lumber.

9. The product of claim 8 wherein the bamboo tape elements are of substantially dimensionally equal sizes and form an interior element surrounded by the molded plastic material.

10. The product of claim 5 wherein the binder is at least one member selected from the group consisting of maleated polypropylene, maleated polyethylene, maleic anyhdride, hydroxyl methacrylate, N-vinyl pyridine, N-vinyl caprolactam, N-vinyl carbaxole, methacrylic acid, ethyl methacrylate, isobutyl methacrylate, sodium styrene sulfonate, bis-vinyl phosphate, divinyl ether-ethylene glycol, vinyl acetate, vinyl toluene, vinylidene chloride, chloroprene, isoprene, dimethylaminoethyl methacrylate, isocetylvinyl ether, acrylonitrile, glycidyl methoacrylate, N-vinyl pyrrolidone, acrylic acid, ethyl acrylate, itaconic acid, methyl acrylate, sodium vinyl sulfonate, cetyl vinyl ether, divinyl ether-butanediol, and octadecyl vinyl acetate, and the plastic is a synthetic polymer.

\* \* \* \* \*